United States Patent Office 3,793,231
Patented Feb. 19, 1974

3,793,231
PREPARATION OF SILVER CATALYSTS FOR THE PRODUCTION OF ETHYLENE OXIDE
Herbert Bergmann, Willi Brauckmann, Hermann Springmann, and Horst Ueberschaer, Marl, Germany, assignors to Chemische Werke Huels, Aktiengesellscraft, Marl, Germany
No Drawing. Filed Apr. 14, 1971, Ser. No. 134,039
Claims priority, application Germany, Apr. 14, 1970,
P 20 17 733.7
Int. Cl. B01j 11/20
U.S. Cl. 252—463        17 Claims

ABSTRACT OF THE DISCLOSURE

Silver catalysts useful for the production of ethylene oxide by the oxidation of ethylene with oxygen or an oxygen containing gas are produced by a process in which a porous support material is impregnated with a suspension of silver oxide in an aqueous solution of a silver salt of an organic acid wherein the molar ratio of silver oxide to dissolved silver salt is about 1.86:1 to 1:1.86 (35–65 molar percent silver oxide based on combined silver oxide and silver salt) and the impregnated support is then heated to 160–230° C.

BACKGROUND OF THE INVENTION

This invention relates to an improved process for the preparation of silver catalysts useful for the production of ethylene oxide by the oxidation of ethylene with oxygen or an oxygen-containing gas.

The production of ethylene oxide by the oxidation of ethylene employing a silver-containing supported catalyst is known. More or less porous masses are employed as the catalyst support, e.g., aluminum oxide, kieselguhr, pumice, silica, calcium carbonate, charcoal, clay and graphite (German Pats. 1,068,235; 1,221,620; and 971,452).

Silver catalysts for the catalyzed oxidation of ethylene to ethylene oxide are prepared by two general methods, viz.,
(a) by applying an aqueous silver oxide suspension to a support (suspension process); or
(b) by impregnating a porous support with a silver salt solution (impregnating process).

In both methods, the treated support is then subjected to a thermal aftertreatment.

In the so-called "suspension process" an aqueous slurry of silver oxide is usually applied to a ceramic support material, e.g., aluminum oxide, thus forming a more or less thick, coherent activating silver layer on the surface of the support. This highly active silver layer can readily be damaged mechanically. Also, this layer adheres poorly to the support material and consequently flakes off easily. As a result, the pressure difference in the reaction tube is increased, so that eventually, with continued increase, the necessary economy of the process is lost (Jean Jaques Bodson, Ind. Chem. Belge, 32 (1967), p. 883).

In order to avoid these disadvantages, efforts have been made to make the precipitated silver oxide particles penetrate as deeply as possible into the pores of the support material in order to thus protect the particles against mechanical abrasion and to prolong the lifetime of the catalyst accordingly. For example, in accordance with the process of German published application DAS 1,064,046, a particularly finely divided, catalytically effective powder is obtained by precipitating silver carbonate and calcium carbonate together in a suitable ratio. This powder is applied, in a glycol-water mixture, to a support whereby a satisfactory adhesion on the support and deep penetration of the catalyst particles into the support are accomplished. However, catalysts produced in accordance with this process are not highly efficient, in spite of the above-described measures.

In the so-called "impregnating method" an aqueous silver salt solution or a silver salt melt is employed in place of a suspension of silver oxide. For example, according to the process of German published application DAS 1,211,607, a porous support material is impregnated with an aqueous solution of silver lactate, and the lactate is decomposed to metallic silver, after drying, at temperatures of between 250 and 380° C. In a preferred embodiment, the water is removed from the silver salt solution under reduced pressure. The so-called "impregnating method" has the disadvantages that the impregnated support must be dried for a long period of time (German publish application DAS 1,260,451, Example 1), and the soluble silver salt must be decomposed at high temperatures (German published application DAS 1,211,607; U.S. Pat. 2,477,435, Example 2; German published application DAS 1,059,429, Example 1).

Since the reduction or decomposition temperature during the production of the catalyst essentially determines the later ethylene oxidation temperature, catalysts are thus obtained in accordance with this impregnation method of preparation which exhibit a satisfactory effect only at relatively high operating temperatures. Consequently, special furnace construction is necessary in order for the process to be economically feasible. Such furnaces permit, with the aid of a heat transfer fluid, operating temperatures of 300° C. and higher, which is not readily possible with the use of the less expensive boiling water reactor. However, boiling water reactors, due to the high specific heat of evaporation, have the advantage of a more satisfactory heat removal which renders these reactors especially suitable for catalysts which produce a high conversion rate. However, the disadvantage of the catalysts produced by the "impregnating method" is that, although they afford good selectivity, they produce a low conversion rate (Jean Jaques Bodson, supra, pp. 880-887).

It is known from U.S. Pat. 2,477,435 that a catalyst prepared by the impregnating process wherein precipitated silver oxide is converted into silver lactate with an aqueous lactic acid solution and this silver lactate solution is employed for impregnating the catalyst support, is adversely affected if the aqueous solution contains even minor amounts of silver or silver oxide (loc. cit., col. 2, lines 11–16). Therefore, according to this patent with the state of the art, the presence of silver or silver oxide in an aqueous silver lactate impregnating solution must be avoided.

It has now been found that supported silver catalysts useful in the production of ethylene oxide by the direct oxidation of ethylene can be prepared by the process of this invention which possess both the high activity and selectivity of the catalysts produced according to the suspension method, but do not exhibit their disadvantage of high susceptibility to abrasion, and which do not have the disadvantage of the catalysts produced according to the impregnating method of having to be prepared by a high temperature to a thermal reduction treatment with resultant high catalyst efficiency only at comparably high oxidation temperatures.

SUMMARY OF THE INVENTION

Silver catalysts for the oxidation with oxygen or an oxygen containing gas of ethylene to ethylene oxide are produced according to the process of this invention by applying to a porous support a silver composition comprising an aqueous suspension of 35–65 molar percent silver oxide in an aqueous solution of correspondingly 65–35 molar percent of a silver oxide in an aqueous solution of correspondingly 65–35 molar percent of a silver salt of an organic acid, based on the combined silver oxide and silver salt, and then heating the treated support to 160–230° C.

DETAILED DISCUSSION

The suspension of silver oxide in the aqueous solution of a soluble silver salt can be prepared in a variety of ways, e.g., the soluble salt or an aqueous solution thereof can be added to an aqueous suspension of the silver oxide or vice versa. In a preferred embodiment, an aqueous silver oxide suspension is treated with an amount of an aqueous solution of an organic acid capable of forming a water-soluble silver salt from silver oxide and which will convert 35–65 molar percent, advantageously 45–55 molar percent, and especially about 50 molar percent, of the silver oxide to the water-soluble silver salt of the organic acid. Thus, in addition to the water-soluble silver salt of the organic acid, there remains 24–52% by weight of unreacted silver oxide, advantageously 42–32% by weight, and especially 37% by weight silver oxide in the final product.

Any water soluble silver salt of an organic acid can be employed in the process of this invention.

It is essential that the soluble silver salt and silver oxide are used as a single component and, the soluble silver salt *and* the silver oxide are used in combination in the stated mol ratio. Therefore there can be used to prepare the soluble silver salt a lower-fatty acid, which by decomposing the silver salt forms volatile oxidation products. The activity of the catalyst depends on the temperature of the ethylene oxide production, which in its turn depends on the mol ratio of silver oxide to soluble silver salt. The silver oxide probably oxides the silver salt by decomposing the carbon skeleton of the used organic acid, by which the silver oxide is reduced to silver.

The mathematical relationship between molar percent and weight percent of the silver oxide and silver salt components of the impregnation composition can be readily calculated, e.g., as set forth below in Table I for a composition employing silver lactate as the silver salt.

TABLE I

| Compound | Molecular weight | Moles/per 100 grams |
|---|---|---|
| Silver metal | 107.87 | 0.93 |
| Silver oxide, Ag$_2$O | 231.74 | 0.43 |
| Silver lactate (anhydrous) | 196.96 | 0.51 |
| Lactic acid | 90.08 | 1.11 |
| Silver nitrate | 169.87 | 0.59 |
| Sodium hydroxide | 40.00 | 2.50 |
| Silver oxalate | 303.76 | 0.33 |

When the silver oxide/soluble silver organic acid salt mixture is prepared by reacting the silver oxide with an organic acid, the acid must have sufficient acidity to convert the silver oxide to a soluble silver salt thereof, e.g., lactic acid pK 3.87, glyoxylic acid pK 3.83, oxalic acid pK 2.80. Generally organic acids which can form a soluble silver salt are those having a pK value between 2.8 and 4.8.

Silver lactate is preferably employed as the silver salt. Accordingly, when producing the soluble silver salt by reaction of silver oxide with an organic acid, lactic acid is preferably utilized as the organic acid.

The catalysts can be prepared by conventionally precipitating silver oxide from an aqueous soltuion of a soluble silver salt, e.g., silver nitrate, with bases, e.g., an aqueous solution of sodium hydroxide or potassium hydroxide. The silver oxide is separated from the mother liquor, e.g., by filtration or centrifugation, and then washed with distilled water until the washing water is discharged free of dissolved salt. One molar equivalent of the silver oxide is then suspended in a solution of from about 0.5 to about two molar equivalents of the selected silver salt of an organic acid, e.g., silver lactate or, more conveniently, about 35–65 molar percent, advantageously about 45–55 molar percent, especially about 50 molar percent, of the silver oxide is converted in a conventional manner to the soluble salt with the selected organic acid. The silver oxide is partially dissolved in the corresponding organic acid, e.g., lactic acid, so that advantageously there remains, in addition to the silver salt of the organic acid formed as a product, 24–52% by weight of unreacted silver oxide, advantageously 32–42% by weight, and especially 37% by weight of unreacted silver oxide.

The amount and concentration of the selected acid will determine the proportion of silver oxide which is converted to a soluble silver salt. Generally, aqueous solutions of the selected acid of 40–80% concentration are employed. Aqueous lactic acid of 70% concentration is preferred.

The thus-obtained silver salt/silver oxide mixture is introduced, together with the support material, into a mixing vessel which can be heated and rotated. The aqueous silver oxide/silver lactate mixture is applied onto and into the pores of the support at a temperature between about 20 and 70° C., preferably under reduced pressure.

In a preferred embodiment, the vacuum which is applied is not maintained constant. Instead, the vacuum is partially reduced by a brief venting, although not to full atmospheric pressure. The number of times this pressure change is effected is dependent, inter alia, on the porosity of the support, the drying temperature, the proportion of soluble silver salt to silver oxide, etc. In general, the pressure change is effected over a period of one minute. After the silver salt/silver oxide mixture, e.g., silver lactate/silver oxide, has penetrated into the support, the pre-catalyst is subjected to a thermal treatment wherein at least a portion of the silver oxide and the silver salt are converted into silver. This is effected in the absence of hydrogen at temperatures of between 160 and 230° C., especially between 190 and 210° C.

In many cases, e.g., in order to obtain a higher proportion of activated metal to support, it is desirable to repeat one or more times the treatment of the support with the aqueous silver oxide/silver salt mixture and the subsequent conversion into silver. In this event, it is possible, beginning with the third such treatment, to employ silver oxide by itself, rather than the silver salt/silver oxide mixture.

The silver content of the thus-produced catalysts generally range between 150 and 460 g./l., preferably between 200 and 305 g./l., which corresponds to 15–35% by weight, preferably 19–27% by weight, of silver.

The support material which is employed for producing the catalysts utilized according to this invention can be used in any form conventional for this type of catalyst, e.g., spheres, rings, pellets. Preferred are shapes which produce the minimum pressure drop in the reactor tube. Preferred are shaped mateials consisting predominantly or entirely of α-aluminum oxide. The pore volume of the support preferably is above 50%, especially about 60% or more. The pore diameter generally ranges from about 200μ to about 2,000μ, preferably up to about 1500μ.

The catalysts produced in accordance with this invention can be employed in the conventional silver catalyzed oxidation of ethylene to ethylene oxide by direct oxidation with oxygen. For example, the oxidation can be conducted at a temperature of between about 240 and 330° C. The oxygen required for the oxidation can be introduced either in the pure or diluted form, e.g., air. The catalysts can be utilized in the usual manner, for example, in tubes or other elongate reaction vessel, the gaseous mixture being conducted thereover.

The aqueous mixture of a soluble silver salt, preferably silver lactate, and extremely finely divided silver oxide suspended therein penetrates into the core of the support material without clogging the pores. As a result, the silver surface area is substantially increased. Another advantage is that the silver salt/silver oxide mixture can be converted into active silver by a thermal treatment in the absence of hydrogen at low temperatures. A further advantage is the decomposition temperature is lower than that of the pure silver salt impregnated pre-catalyst and lower than the reducing temperature of the pure silver oxide suspension catalyst in the presence of hydrogen. The temperatures required for the reduction vary with the proportion of silver oxide:silver salt, as shown in Table II.

TABLE II

| Ag as silver lactate, molar percent of total Ag | Ag as $Ag_2O$, molar percent of total Ag | Reduction temperature, °C. |
|---|---|---|
| 25 | 75 | ca. 170 |
| 50 | 50 | ca. 200 |
| 75 | 25 | ca. 240 |
| 100 | | [1] 300–500 |

[1] U.S. Patent 2,477,435.

It can be seen from Table III, below, that markedly impaired results are obtained outside of the limits of the molar ratio of the silver lactate:silver oxide employed in the process of this invention. In particular, Comparative Examples 3(a) and (b) and 4(a) and (b), respectively, show that a rapid reduction in ethylene conversion rates occurs within a few days.

Compared to conventionally prepared supported silver catalysts, the catalysts prepared according to this invention are more resistant to mechanical abrasion and also exhibit a considerable increased selectivity with high conversions. Even after a longer period of operation, the reaction tubes are not clogged by abraded catalyst, and thus excessive pressure drop is avoided. Since practically the entire support material is penetrated by silver, the catalyst is well capable of eliminating heat of reaction and thus shows low sensitivity to high thermal stresses.

TABLE III

| Example | 1-(a) | Comparative examples | | | |
|---|---|---|---|---|---|
| | | 3(a) | 3(b) | 4(a) | 4(b) |
| Molar ratio, percent Ag lactate/$Ag_2O$ | 50/50 | 75/25 | | 25/75 | |
| Weight percent silver as $Ag_2O$ | 37 | 16 | | 64 | |
| Throughput conversion rate, $Nm.^3/h$ | 22.3 | 22.3 | 22.3 | | |
| Temperature, °C | 276 | 280 | 280 | 280 | 280 |
| G. Ag/l. catalyst | 204 | 202 | 202 | 195 | 195 |
| Pressure, atm. gauge | 19.1 | 19.5 | 19.5 | | |
| Ethylene, vol. percent | 4 | 4 | 4 | 4 | 4 |
| Oxygen, vol. percent | 5.3 | 5.0 | 5.0 | 5.0 | 5.0 |
| Pore diameter, $\mu$ | 50 to 1,500 in all examples | | | | |
| Pressure drop ($\Delta P$), at | 0.74 | 0.80 | 0.80 | 0.79 | 0.79 |
| G. ethylene oxide/$Nm.^3$ | 28.9 | 24.1 | 17.5 | 25.7 | 22.1 |
| Conversion, percent | 51.2 | 42.8 | 28.2 | 47.2 | 39.3 |
| Yield, percent | 71.6 | 69.0 | 77.0 | 69.8 | 70.8 |
| Operating time, days | 90 | 2 | 7 | 2 | 7 |

Without further elaboration, it is believed that one skilled in the art can, using the preceding description, utilize the present invention to its fullest extent. The following preferred specific embodiments are, therefore, to be construed as merely illustrative; and not limitative of the remainder of the disclosure in any way whatsoever.

EXAMPLE 1

107 g. of silver nitrate (0.629 mol) is dissolved in 1500 ml. of fully desalted water. A solution of 27.8 g. of sodium hydroxide (0.695 mol) in 125 cc. of fully desalted water is gradually added under agitation at room temperature, so that the temperature does not exceed 25° C. The thus-precipitated silver oxide is vacuum-filtered and slowly washed with fully desalted water until the discharged washing water is free of salt. To 100 molar percent of the moist silver oxide is slowly added 28.4 g. lactic acid (0.315 mol) as 40.5 g. aqueous solution of 70% concentration, by which 50 molar percent of the oxide is converted to silver lactate. Then 150 ml. of fully desalted water are added. Thereafter, this mixture is combined with 1000 ml. (about 845 g.) of catalyst support in a pelletizing drum which can be heated and evacuated. The support, which is in the form of spheres, has the following composition and properties:

85% α-aluminum oxide
13% silicon dioxide
Diameter: 6–9 mm.
Pore volume: about 60%
Pore diameter: 200–1500 microns.

At a temperature of 50–55° C. and under a pressure of about 80 torr, the silver oxide/silver lactate mixture is introduced into and onto the support in the pelletizing drum, at a speed of about 10 r.p.m. The pressure is increased to 100–120 torr about once per minute by brief venting. After about 30 minutes, 85% of the amount of water has been evaporated. The thus-applied and introduced silver lactate/silver oxide mixture is converted into active silver by heating the crude pre-catalyst to 190° C.

Following the above-described procedure, an additional layer of active silver is introduced into the catalyst in the same manner.

The finished catalyst has an apparent density of 1049 g./l. and contains 204 g. of silver per liter ($\triangleq$ 19.45% by weight of silver, based on the total catalyst).

The catalyst is tested in an apparatus consisting of three reactor tubes having a length of 600 mm. and a diameter of 26 mm. of stainless steel. The reactor tubes are surrounded by a jacket containing water or steam for removing the heat of reaction. Each reactor tube is filled with 2.7 l. of catalyst.

A gaseous mixture consisting of:

4% by volume of ethylene
5.3% by volume of oxygen
7.8% by volume of carbon dioxide
remainder: nitrogen is passed over the catalyst at a throughput rate of 22.3 $Nm.^3/h$. per tube. The pressure is 19.1 atmospheres gauge, and the temperature in the steam chamber is 278° C., 28.9 g. of ethylene oxide is obtained per $Nm.^3$ of gaseous mixture, which corresponds to a conversion of 51.2% with a selectivity of 71.6%. The pressure drop ($\Delta p$) in the reactor tube is 0.74 atmosphere gauge.

COMPARATIVE EXAMPLE 1

Following the procedure of Example 1, except using a catalyst containing 203 g. of silver per liter of catalyst, and having the same support and prepared under otherwise identical conditions from silver oxide only, 26.9 g./$Nm.^3$ of ethylene oxide is obtained at 280° C. under a pressure of 19.2 atmospheres gauge, at a throughput of 22.3 $Nm.^3/h$. of a gaseous mixture containing 4% by volume of ethylene and 5% by volume of oxygen under conditions otherwise corresponding to Example 1, which corresponds to a conversion of 47.3% with a selectivity of 71.6%.

EXAMPLE 2

A silver catalyst containing 204 g. of silver per liter of catalyst is produced according to the method described in Example 1. The activity of the catalyst is tested in a reactor consisting of a stainless steel tube having a length of 6000 mm. and an inside diameter of 26 mm.

Under a pressure of 18.2 atmospheres gauge, 12.3 $Nm.^3/h$. of a gaseous mixture consisting of:

2.35% by volume of ethylene
4.6% by volume of oxygen
8.5% by volume of carbon dioxide
remainder: nitrogen is passed over 2.7 l. of catalyst. The heat of reaction is removed with the aid of water cooling. At a steam temperature of 273° C., a conversion of 79.0% and a selectivity of 69.0% are attained. The pressure drop ($\Delta p$) in the tube is 0.34 atm. gauge.

COMPARATIVE EXAMPLE 2

Using a catalyst employing the same support and containing 203 g. of silver per liter, only silver oxide being employed in the production of the catalyst, under otherwise identical conditions a conversion of 73.9% at a selectivity of 60.3% is obtained under the experimental conditions of Example 2.

In Table III, the results of the experiments and comparative experiments have been compiled.

TABLE III

|  | Ex. 1 | Comparative Ex. 1 | Ex. 2 | Comparative Ex. 2 |
| --- | --- | --- | --- | --- |
| Temperature, °C | 278 | 280 | 273 | 273 |
| Pressure, atm. gauge | 19.1 | 19.2 | 18.2 | 18.2 |
| Throughput, $Nm.^3/h$ | 22.3 | 22.3 | 12.3 | 12.3 |
| G. silver/l. catalyst | 202 | 203 | 204 | 203 |
| Ethylene, vol. percent | 4 | 4 | 2.35 | 2.4 |
| Oxygen, vol. percent | 5.3 | 5 | 4.6 | 4.5 |
| Pore diameter, $\mu$ | 50 to 1,500 in all examples | | | |
| Pressure drop ($\Delta P$), atm. gauge | 0.74 | 0.73 | 0.34 | 0.34 |
| G. ethylene oxide/$Nm.^3$ | 28.9 | 26.9 | 25.0 | 23.8 |
| Conversion, percent | 51.2 | 47.3 | 79.0 | 73.9 |
| Yield, percent | 71.6 | 71.6 | 69.0 | 60.3 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the preparation of supported silver catalysts useful for the production of ethylene oxide by the oxidation of ethylene with gaseous oxygen in which a porous support material is impregnated with an aqueous suspension of silver oxide and the silver oxide then converted to free silver, the improvement which comprises:
    (a) impregnating said porous support material with an aqueous composition consisting essentially of
        (i) 35–65 molar percent silver oxide in suspension, and
        (ii) correspondingly 65–35 molar percent of a silver salt of an aliphatic carboxylic acid having a pK value of 2.8–4.8 in solution; and
    (b) heating the impregnated support to form active silver.

2. A process according to claim 1 wherein the water soluble salt is silver lactate.

3. A process according to claim 1 wherein the suspension of silver oxide in an aqueous solution of a silver salt of said acid is obtained by treating silver oxide with an amount of said acid sufficient to convert about 35–65 molar percent of the silver oxide into a water-soluble salt of said acid.

4. A process according to claim 3 wherein the said acid is lactic acid.

5. A process according to claim 3 wherein about 45–55 molar percent of the silver oxide is converted to a soluble silver salt.

6. A process according to claim 1 wherein the impregnating and heating steps are repeated.

7. A process according to claim 6 wherein after the impregnating and heating steps have been repeated once the impregnated support is thereafter again impregnated only with silver oxide.

8. A process according to claim 3 wherein the impregnated and heating steps are repeated.

9. A process according to claim 8 wherein the said acid is lactic acid.

10. A process according to claim 9 wherein after the impregnating and heating steps have been repeated once, the impregnated support is thereafter again impregnated only with silver oxide.

11. A process according to claim 1 wherein the support is impregnated with an amount of the aqueous suspension of silver oxide which imparts a final silver content thereto of 15–35% by weight.

12. A process according to claim 11 wherein the aqueous suspension of silver oxide is obtained by mixing silver oxide with an aqueous solution of the selected acid of a concentration of 40–80%.

13. A process according to claim 11 wherein the said acid is lactic acid.

14. A process according to claim 11 wherein the support is aluminum oxide.

15. A process according to claim 14 wherein the said acid is lactic acid.

16. A process according to claim 1 wherein said support is heated to a temperature of about 160–230° C.

17. A process according to claim 11 wherein the said acid is lactic acid, glyoxylic acid or oxalic acid.

References Cited

UNITED STATES PATENTS

| 2,404,438 | 7/1946 | Evans | 260—348.5 R |
| 2,307,421 | 1/1943 | Overhoff | 252—476 X |
| 3,172,893 | 3/1965 | Ameen | 260—348.5 |
| 2,773,844 | 12/1956 | Carlson | 252—463 |

FOREIGN PATENTS

| 1,115,192 | 5/1968 | Great Britain | 252—476 |

DANIEL E. WYMAN, Primary Examiner

W. J. SHINE, Assistant Examiner

U.S. Cl. X.R.

252—476